(12) United States Patent
Quincay et al.

(10) Patent No.: US 9,810,308 B2
(45) Date of Patent: Nov. 7, 2017

(54) PULLEY DEVICE

(71) Applicants: Claude Quincay, Saint Ouen les Vignes (FR); Mickael Cousinery, Charentilly (FR)

(72) Inventors: Claude Quincay, Saint Ouen les Vignes (FR); Mickael Cousinery, Charentilly (FR)

(73) Assignee: AKTIEBOLAGET SKF, Gothenburg (SE)

( * ) Notice: Subject to any disclaimer, the term of this patent is extended or adjusted under 35 U.S.C. 154(b) by 1 day.

(21) Appl. No.: 14/960,503

(22) Filed: Dec. 7, 2015

(65) Prior Publication Data

US 2016/0160988 A1 Jun. 9, 2016

(30) Foreign Application Priority Data

Dec. 8, 2014 (FR) ..................................... 14 62046

(51) Int. Cl.
 *F16H 7/20* (2006.01)
 *F16H 55/36* (2006.01)
 *F16C 13/00* (2006.01)
 *F16C 35/063* (2006.01)
 *F16C 19/08* (2006.01)

(52) U.S. Cl.
 CPC ........... *F16H 55/36* (2013.01); *F16C 13/006* (2013.01); *F16C 35/063* (2013.01); *F16H 7/20* (2013.01); *F16C 19/08* (2013.01); *F16C 2361/63* (2013.01)

(58) Field of Classification Search
 CPC ..... B66D 2700/028; B66D 3/04; F16H 55/36; F16H 55/44; Y10T 29/49455

USPC .................................................. 474/199, 198
 See application file for complete search history.

(56) References Cited

U.S. PATENT DOCUMENTS

| | | | | | |
|---|---|---|---|---|---|
| 1,162,145 | A | * | 11/1915 | Dosch et al. ....... | B60B 33/0028 16/46 |
| 2,279,887 | A | * | 4/1942 | Hathorn ................. | F16H 55/50 254/398 |
| 2,421,685 | A | * | 6/1947 | Cbot ..................... | F16C 13/006 254/393 |
| 3,746,413 | A | * | 7/1973 | Nishikawa ............ | F16C 13/006 384/542 |

(Continued)

FOREIGN PATENT DOCUMENTS

| | | |
|---|---|---|
| CN | 203272722 U | 11/2013 |
| DE | 19850157 A1 | 5/1999 |

(Continued)

*Primary Examiner* — Henry Liu
(74) *Attorney, Agent, or Firm* — Bryan Peckjian; SKF USA Inc. Patent Dept.

(57) ABSTRACT

A pulley device comprising a rolling bearing including an inner ring defining a central bore, and outer ring and rolling elements mounted between the inner ring and the outer ring, a pulley secured in rotation with the outer ring and provided with a feature for engaging with a transmission member. The pulley additionally includes a screw comprising a head and a shank housed in the central bore of the inner ring, the screw being configured to fix the pulley device to a motor support. The pulley device also comprises a first sleeve arranged between the inner ring and the screw, on the side of the motor support. The first sleeve includes an inner surface that has a frustoconical portion having an increasing diameter toward the head of the screw.

19 Claims, 4 Drawing Sheets

(56) References Cited

U.S. PATENT DOCUMENTS

| | | | | |
|---|---|---|---|---|
| 3,757,959 | A * | 9/1973 | Thompson | B66C 23/66 212/271 |
| 3,959,899 | A * | 6/1976 | Rangaswamy | E02F 3/48 254/393 |
| 4,747,810 | A * | 5/1988 | Shepley | F16C 13/006 384/192 |
| 6,241,257 | B1 * | 6/2001 | Hauck | F16C 13/006 277/637 |
| 6,357,926 | B1 * | 3/2002 | Hauck | F16C 13/006 384/546 |
| 6,811,506 | B2 * | 11/2004 | Douse | F16C 13/006 474/148 |
| 6,854,893 | B2 * | 2/2005 | Schmidt | F16C 13/006 384/477 |
| 7,011,593 | B2 * | 3/2006 | Schenk | F16C 13/006 384/477 |
| 7,041,020 | B2 * | 5/2006 | Singer | F16C 13/006 474/152 |
| 7,108,623 | B2 * | 9/2006 | Cadarette | F16H 55/36 474/166 |
| 7,419,448 | B2 * | 9/2008 | Miyata | F16H 7/12 474/118 |
| 7,448,807 | B2 * | 11/2008 | Schenk | F16C 13/006 384/417 |
| 7,695,385 | B2 * | 4/2010 | Barraud | F16C 35/04 384/484 |
| 8,651,988 | B2 * | 2/2014 | Kapfer | F16C 13/006 474/101 |
| 2004/0077445 | A1 * | 4/2004 | Prior | F16C 13/006 474/133 |
| 2004/0097313 | A1 * | 5/2004 | Singer | F16C 13/006 474/199 |
| 2004/0235599 | A1 * | 11/2004 | Ozorak | F16C 13/006 474/199 |
| 2005/0026729 | A1 * | 2/2005 | Schenk | F16C 13/006 474/101 |
| 2005/0070388 | A1 * | 3/2005 | Miyata | F16H 7/12 474/199 |
| 2008/0242523 | A1 * | 10/2008 | Stief | F16C 13/006 492/7 |
| 2014/0004985 | A1 * | 1/2014 | Lescorail | F16H 7/12 474/166 |
| 2015/0141185 | A1 * | 5/2015 | Albrecht | F16H 7/1281 474/199 |

FOREIGN PATENT DOCUMENTS

| | | |
|---|---|---|
| DE | 10035488 A1 | 1/2002 |
| DE | 2006019538 A | 10/2007 |
| DE | 102007039136 A1 | 2/2009 |
| WO | 0221005 A1 | 3/2002 |

* cited by examiner

PULLEY DEVICE

CROSS REFERENCE TO RELATED APPLICATION

This is a Non-Provisional Patent Application, filed under the Paris Convention, claiming the benefit of France (FR) Patent Application Number 1462046, filed on 8 Dec. 2014, which is incorporated herein by reference in its entirety.

FIELD OF THE INVENTION

The invention relates to a pulley device. The field of the device is that of tension rollers for stretching a chain or belt for transmitting movements, rollers, winders, loose pulleys and any other means for support and transmitting rotation.

BACKGROUND OF THE INVENTION

In a known manner, such a pulley device may comprise a rolling bearing and a fixing screw. The rolling bearing comprises an inner ring and an outer ring in relative rotation. The screw comprises a head end and a threaded end. The screw crosses through the inner ring of the rolling bearing, such that its threaded end penetrates inside a tapped orifice arranged in a support, for example an engine block. To the extent possible, mechanical contact should be avoided between the rotating elements of the rolling bearing and the support, which can in particular be positioned in the engine compartment of a motor vehicle and subject to frequent vibrations.

To that end, it is known to use a spacer to axially separate the rolling bearing from the support. To produce this spacer, a first approach consists of integrating the spacer into the inner ring of the rolling bearing. One drawback of this approach is that it makes the manufacturing and assembly of the pulley devices equipped with such spacers more complex.

According to a second approach, the spacer is a separate part from the rolling bearing. The pulley device is then equipped with a metal sleeve that is secured to the inner ring of the rolling bearing. One drawback of this approach relates to the weight and cost of the sleeve.

In this respect, it is known, for example from DE-A-198 50 157, to provide a sleeve made from a plastic material that is overmolded or fitted on the inner ring of the rolling bearing. Such a pulley device is simple and cost-effective to manufacture.

It is also known, for example from DE-A-10 200 60 19 538, to provide two sleeves with a reduced size and that define an axial interstice between them. When the fixing screw is inserted through the sleeves, this screw is often inserted at an angle and then collides with an edge of the sleeve positioned against the support. Using two sleeves makes it possible to reduce the weight and cost of the pulley device, but complicates the insertion of the screw into the support.

SUMMARY OF THE INVENTION

The present invention more particularly aims to resolve these drawbacks, by proposing a new pulley device that facilitates the insertion of the screw.

To that end, the invention relates to a pulley device, comprising a rolling bearing including an inner ring defining a central bore, an outer ring and rolling elements mounted between the inner ring and the outer ring. The pulley device also comprises a pulley, secured in rotation with the outer ring and provided with means for engaging with a transmission member, as well as a screw comprising a head and a shank housed in the central bore of the inner ring, the screw being configured to fix the pulley device to a motor support. The pulley device also comprises a first sleeve arranged between the inner ring and the screw, on the side of the motor support. According to the invention, the sleeve includes an inner surface that has a frustoconical portion having an increasing diameter toward the head of the screw.

Thus, the invention makes it possible to prevent the screw from being jammed against the second sleeve during its insertion through the device. The shank of the screw passes in the inner central bore of the inner ring, then through the frustoconical portion of the sleeve without any risk of colliding with one of its edges, before penetrating the support. Furthermore, providing a frustoconical portion on the sleeve makes it possible to reduce the weight, and therefore cost, of the device.

According to advantageous, but optional aspects of the invention, such a pulley device may incorporate one or more of the following features, considered in any technically admissible combination:

- The pulley device further comprises a second sleeve arranged between the inner ring and the screw.
- An axial gap is defined between the first sleeve and the second sleeve arranged in the bore of the inner ring, the axial gap having a length greater than or equal to half of the length of the bore.
- The second sleeve has an inner surface that has a frustoconical portion having a diameter increasing toward the first sleeve.
- The first and second sleeves have an identical construction.
- The inner surface of at least one of the first and second sleeves has a frustoconical portion having an increasing diameter and emerging opposite the other sleeve.
- At least one of the first and second sleeves has a cylindrical outer surface provided with at least one rib positioned bearing against the inner ring of the rolling bearing.
- The minimum diameter of the inner surface of the first sleeve is smaller than the diameter of the shank of the screw.
- The inner surface of the first sleeve is frustoconical over more than 80% of its axial length.
- The frustoconical portion of the first sleeve extends over its entire inner surface.
- At least one of the first and second sleeves is provided with an outer bevel, and an end oriented toward the other sleeve.
- The first sleeve is mounted on the inner ring by overmolding, gluing or pressing.
- The first sleeve is made from a synthetic material, in particular polyamide reinforced with glass fibers.

BRIEF DESCRIPTION OF THE FIGURES

The invention will be better understood and other advantages thereof will appear more clearly in light of the following description, provided solely as a non-limiting example and done in reference to the appended drawings, in which.

DETAILED DESCRIPTION OF THE EMBODIMENTS

Figure 1:
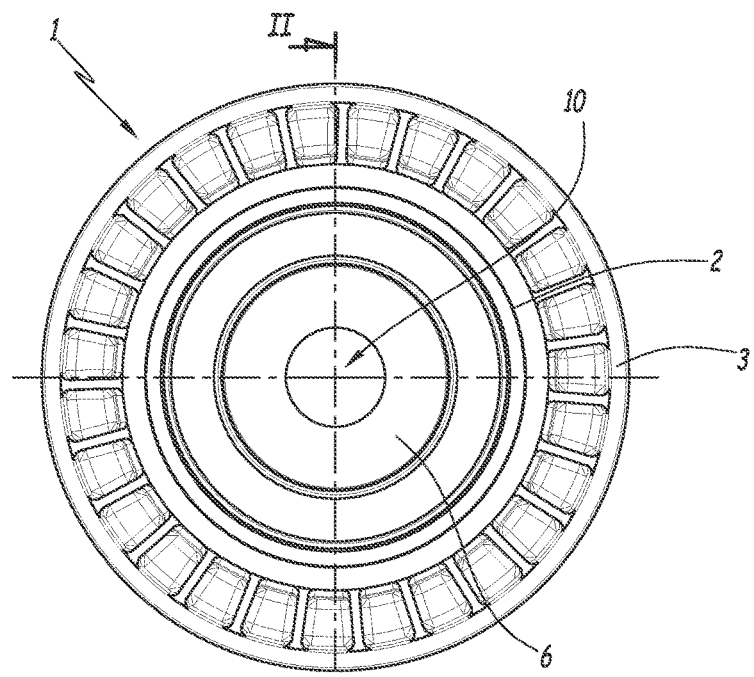
FIG. 1 is an elevation view of a pulley device according to a first embodiment of the invention, comprising a pulley, a rolling bearing, two sleeves and a fixing screw, which is not shown for simplification reasons.
Figure 2:
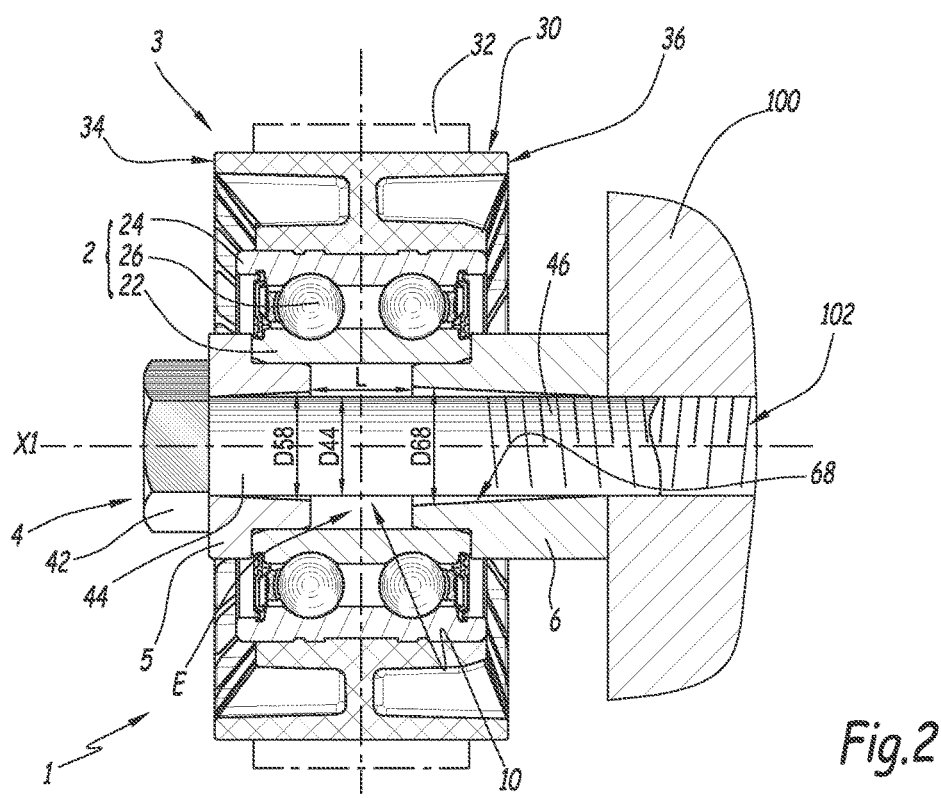
FIG. 2 is a sectional view, along plane II-II of FIG. 1, of the pulley device of FIG. 1 when it is mounted on a motor support using its screw, the second sleeve being inserted between the screw head and the rolling bearing, the first sleeve being inserted between the rolling bearing and the motor support.

FIGS. 1 and 2 show a pulley device 1 according to the invention, of the tension roller type.

The pulley device 1 is designed to be mounted on a motor support 100, partially shown in FIG. 2. This pulley device 1 comprises a ball bearing 2, a pulley 3, a fastening screw 4, and two sleeves 5 and 6. Reference X1 denotes a central axis of the pulley device 1. The pulley device 1 defines a central bore 10 centered on the axis X1. Reference L denotes the length of the bore 10 measured parallel to the axis X1.

Hereinafter, the terms "axial" and "radial" are defined in relation to the axis X1. Thus, an axial direction is parallel to the axis X1 and a radial direction is perpendicular to the axis X1 and secant to that axis. An axial surface is perpendicular to an axial direction and a radial surface is perpendicular to a radial direction.

The ball bearing 2 includes an inner ring 22, an outer ring 24 and rolling elements 26 mounted between the inner ring 22 and the outer ring 24. In the non-limiting example of FIG. 2, the rolling elements 26 are made up of two rows of balls 26. Alternatively, the rolling elements 26 can be rollers or needles.

The pulley 3 is fixed on the outer ring 24, for example by gluing, overmolding, tight mounting or crimping. The pulley 3 is secured in rotation, around the axis X1, with the outer ring 24. The pulley 3 is provided with an outer peripheral surface 30, i.e., the surface of the pulley 3 oriented radially outward relative to the axis X1. This surface 30 is provided to receive, by bearing, a belt 32 shown in mixed lines in FIG. 2. The surface 30 forms means for engagement of the pulley 3 with the belt 32, which forms a torque transmitting member. In place of the belt 32, the device 1 can receive a chain mounted around the surface 30, whose geometry is then adapted. References 34 and 36 respectively denote the opposite annular surfaces of the pulley 3, which are parallel to one another and perpendicular to the axis X1, the surface 36 being turned toward the motor support 100.

The fastening screw 4 is received in the bore 10 of the device 1. The screw 4 comprises a head 42 and a shank 44, which extends from the head 42 to a threaded end 46. Reference D44 denotes the constant diameter of the shank 44. Reference X4 also denotes a longitudinal axis of the screw 4, which is superimposed on the axis X1 when the screw 4 is received in the bore 10.

The pulley device 1 comprises a first sleeve 6 and a second sleeve 5 that delimit the bore 10 with the inner ring 22. The sleeves 5 and 6 are made from a synthetic material, for example polyamide reinforced with glass fibers. The sleeves 5 and 6 are mounted on the inner ring 22 by overmolding, gluing or pressing.

Figure 3:
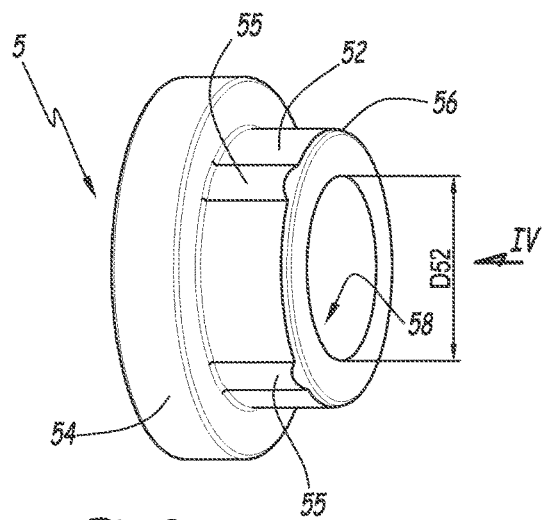
FIG. 3 is a perspective view of the second sleeve shown in FIG. 2.
Figure 4:
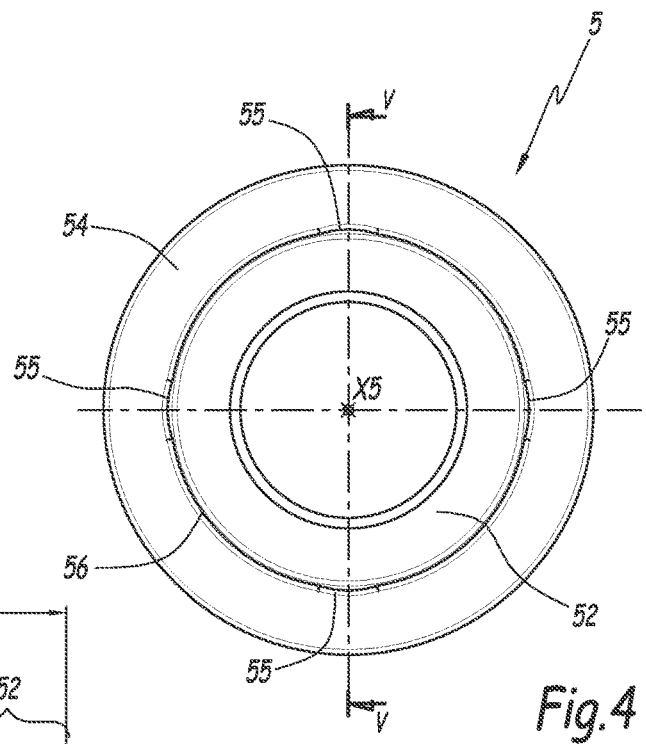
FIG. 4 is an elevation view of the second sleeve along arrow IV in FIG. 3.
Figure 5:
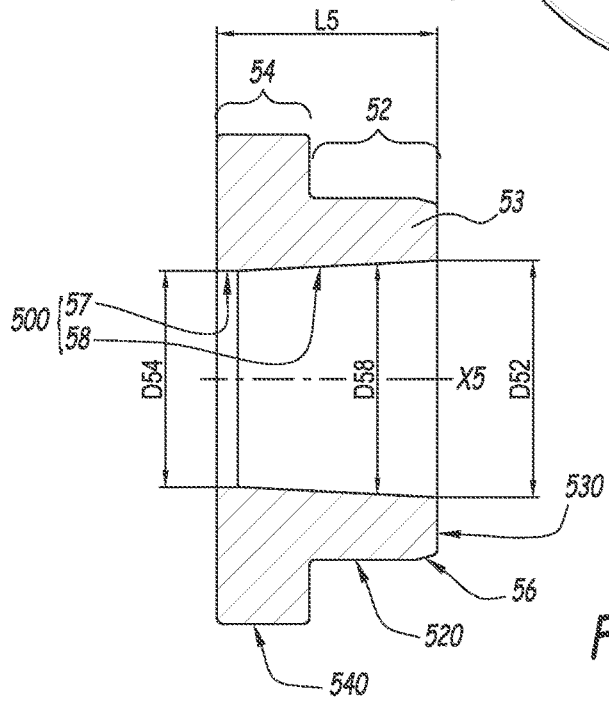
FIG. 5 is a sectional view of the second sleeve along plane V-V in FIG. 4.

The second sleeve 5, shown in detail in FIGS. 3 to 5, is arranged radially between the inner ring 22 and the screw 4 on the side of its head 42. In practice, the sleeve 5 is designed to receive, by bearing, the head 42 of the screw 4 when it is tightened in a corresponding tapping 102 of the motor support 100.

The sleeve 5 is centered on an axis X5 that is combined with the axes X1 and X4 in the mounted configuration of the pulley device 1. Reference L5 denotes the axial length of the sleeve 5.

The sleeve 5 comprises an inner axial portion 52, which is positioned radially between the inner ring 22 and the shank 44 of the screw 4, and an outer axial portion 54 that is positioned axially between the inner ring 22 and the head 42 of the screw 4. The portion 52 includes a cylindrical outer surface 520, provided to come into contact with the inner ring 22. In the example of FIGS. 4 and 5, the surface 520 is provided with four ribs 55 designed to bear against the inner ring 22 of the rolling bearing 2. Alternatively, the surface 520 can be provided with a different number of ribs 55. When the portion 52 of the sleeve 5 is inserted into the inner ring 22, the ribs 55 exert a maintaining force on the inner ring 22. The portion 54 includes a radial and outer cylindrical surface 540, oriented toward the pulley 3.

The sleeve 5 further comprises an inner radial surface 500 which, in the assembled configuration, is oriented toward the axis X1 and the screw 4. The surface 500 is frustoconical over the majority of its length L5. The surface 500 comprises a cylindrical portion 57, in contact with the shank 44 in the mounted configuration of the pulley device 1, and a frustoconical portion 58. The frustoconical portion 58 has a diameter D58 that increases toward the first sleeve 6. Reference D52 denotes the maximum inner diameter of the sleeve 5, measured on the side of the portion 52, and reference D54 also denotes the minimum inner diameter of the sleeve 5, measured on the side of the portion 54. The diameter D52 is strictly greater than the diameter D54. In particular, the diameter D54 is the diameter of the cylindrical portion 57. Before the shank 44 of the screw 4 is inserted in the bore 10, the diameter D54 is slightly smaller than the diameter D44 of the shank 44 of the screw 4, such that, when the screw 4 is received in the bore 10 of the pulley device 1, the sleeve 5, in particular its cylindrical portion 57, is radially expanded and exerts a retaining force on the screw 4.

The portion 52 of the sleeve 5 includes an end 53, which is oriented toward the first sleeve 6 and includes an annular surface 530 perpendicular to the axis X5. The end 53 of the sleeve 5 is provided with a bevel 56 arranged at the junction between the surfaces 520 and 530. The bevel 56 is provided to facilitate the mounting of the sleeve 5 in the inner ring 22 of the rolling bearing 2.

The frustoconical portion 58 extends, from the annular surface 530, over more than 80% of the lengths L5 of the sleeve 5. In practice, the portion 58 extends over more than 90% of the lengths L5.

According to one alternative of the invention that is not shown, the frustoconical portion 58 can extend over the entire length L5. In that case, the surface 500 does not comprise a cylindrical portion.

Figure 6:
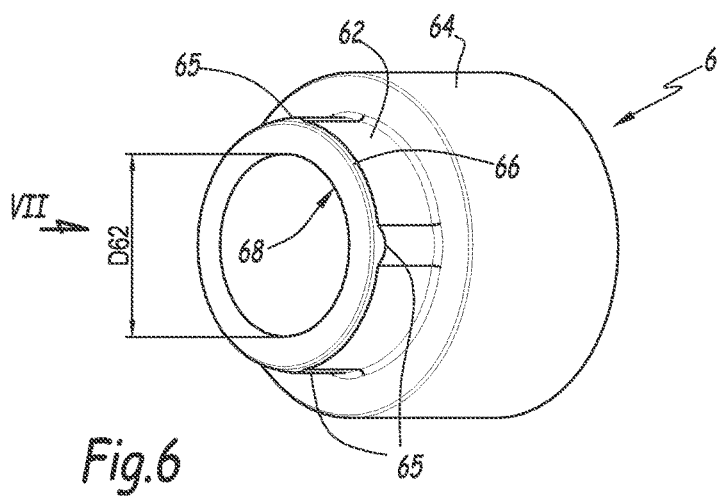
FIG. 6 is a perspective view of the first sleeve shown in FIGS. 1 and 2.
Figure 7:
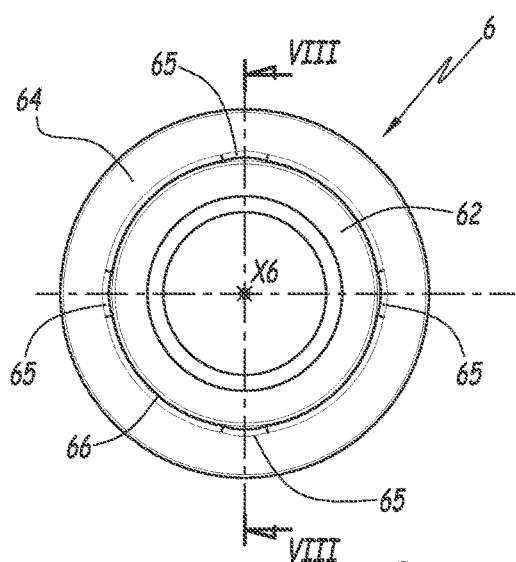
FIG. 7 is an elevation view of the first sleeve along arrow VII in FIG. 6.
Figure 8:
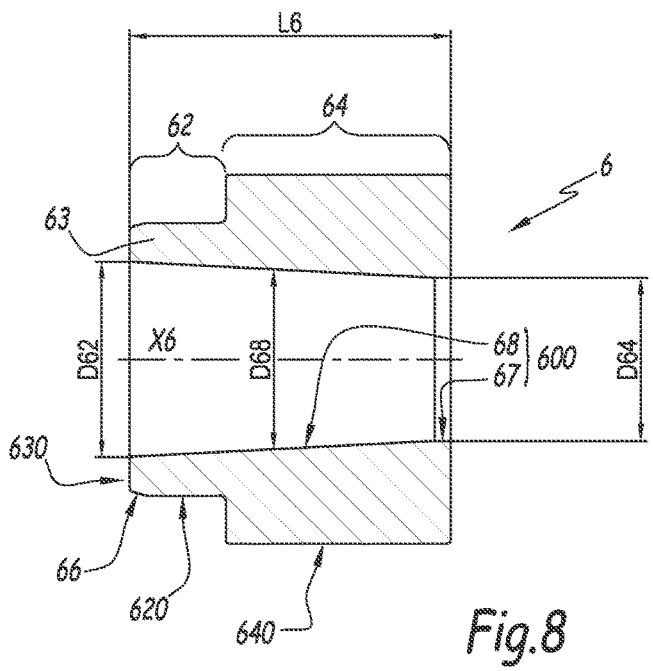
FIG. 8 is a sectional view of the first sleeve along plane VIII-VIII in FIG. 7.

The first sleeve 6, shown in detail in FIGS. 6 to 8, is arranged radially between the inner ring 22 and the screw 4 on the side of the motor support 100. In practice, the sleeve 6 is designed to receive the motor support 100 by bearing when the threaded end of the screw 4 is tightened in the corresponding tapping 102 of this motor support.

The sleeve 6 is centered on an axis X6 that is combined with the axes X1, X4 and X5 in the mounted configuration of the device 1. Reference L6 denotes the axial length of the sleeve 6.

The sleeve 6 comprises an inner axial portion 62, which is positioned radially between the inner ring 22 and the shank 44 of the screw 4, and an outer axial portion 64, which is positioned axially between the inner ring 22 and the motor support 100. The portion 62 includes a cylindrical outer surface 620 provided to come into contact with the inner ring 22. In the example of FIGS. 6 and 7, the surface 620 is provided with four ribs 65 designed to bear against the inner ring 22 of the rolling bearing 2. Alternatively, the surface 620 can be provided with a different number of ribs 65. When the portion 62 of the sleeve 6 is inserted into the inner ring 22, the ribs 65, like the ribs 55 of the sleeve 5, exert a maintaining force on this inner ring 22. The portion 64 includes a radial and outer cylindrical surface 640, oriented toward the pulley 3.

The sleeve 6 further comprises an inner radial surface 600 which, in the assembled configuration, is oriented toward the axis X1 and the screw 4. The surface 600 is frustoconical over most of its length L6. The surface 600 comprises a cylindrical portion 67, bearing on the shank 44 in the mounted configuration of the pulley device 1, and a frustoconical portion 68. The frustoconical portion 68 has a diameter D68 that increases toward the second sleeve 5. Reference D62 denotes the maximum inner diameter of the sleeve 6, measured on the side of the portion 52, and reference D64 also denotes the minimum inner diameter of the sleeve 6, measured on the side of the portion 64. The diameter D62 is strictly larger than the diameter D64. In particular, the diameter D64 is the diameter of the cylindrical portion 67. Before insertion of the shank 44 of the screw 4 in the bore 10, the diameter D54 is slightly smaller than the diameter D44 of the shank 44 of the screw 4, such that, when the screw 4 is received in the bore 10 of the pulley device 1, the sleeve 6, in particular the cylindrical portion 67, is radially expanded and exerts a retaining force on the screw 4.

The portion 62 of the sleeve 6 includes an end 63, which is turned toward the second sleeve 5 and includes an annular surface 630 perpendicular to the axis X6. The end 63 of the sleeve 6 is provided with a bevel 66 arranged at the junction between the surfaces 620 and 630. The bevel 66, like the bevel 56 of the second sleeve 5, is provided to facilitate the mounting of the sleeve 6 in the inner ring 22 of the rolling bearing 2. The frustoconical portion 68 extends, from the annular surface 630, over more than 80% of the length L6 of the sleeve 6. In practice, the portion 68 extends over more than 90% of the lengths L6.

According to one alternative of the invention that is not shown, the frustoconical portion 68 extends over the entire length L6. In this case, the surface 600 does not comprise a cylindrical portion.

As shown in FIG. 2, an axial gap E is defined parallel to the axis X1 between the surface 530 of the second sleeve 5 and the surface 630 of the first sleeve 6. Reference l denotes the length of the gap E measured parallel to the axis X1. The length l is greater than or equal to half of the length L of the bore 10.

At this gap E, the inner ring 22 directly delimits the bore 10 radially to the axis X1. This allows a significant reduction in the weight of the pulley device 1. Furthermore, owing to the frustoconical portion of the surface 600, the insertion of the screw 4 is facilitated, since the end 46 of the screw 4 does not abut against a junction edge of the surfaces 600 and 630. The frustoconical nature of the surface 58 also facilitate the insertion of the shank 44 of the screw into the bore 10 while allowing angular play between the parts 4 and 5, during this insertion.

Other embodiments of the invention are described below in reference to FIGS. 9 and 10. In these embodiments, the component elements of the pulley device 1 are comparable to those of the first embodiment described above and, for simplification reasons, bear the same numerical references. Only the differences with respect to the first embodiment are described below.

Figure 9:
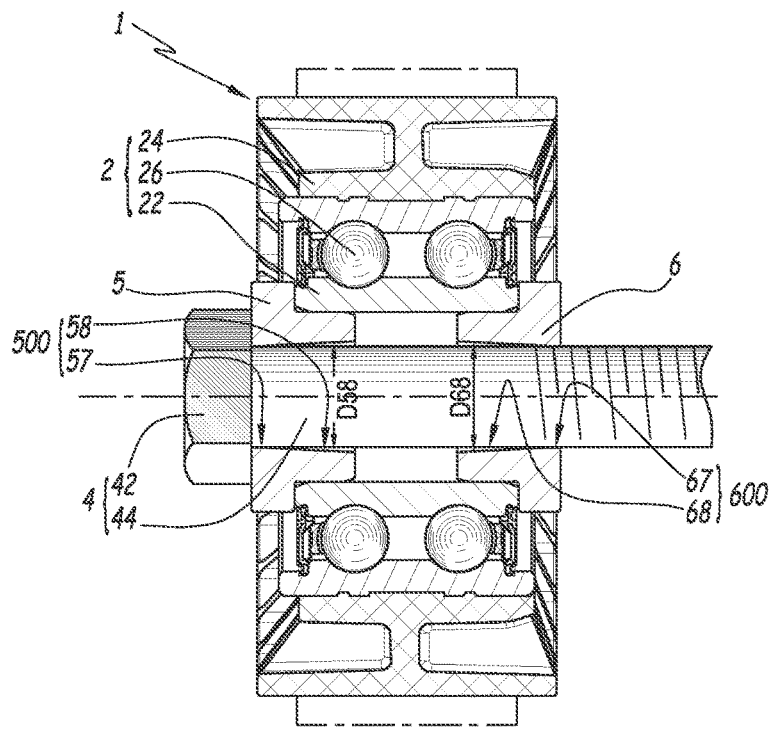
FIG. 9 is a view similar to FIG. 2 of a pulley device according to a second embodiment of the invention.

According to the second embodiment, shown in FIG. 9, the second sleeve 5 and the first sleeve 6 have an identical construction, in practice the same as that of the sleeve 5 of the first embodiment. This makes it possible to reduce the manufacturing costs of the parts 5 and 6.

Figure 10:
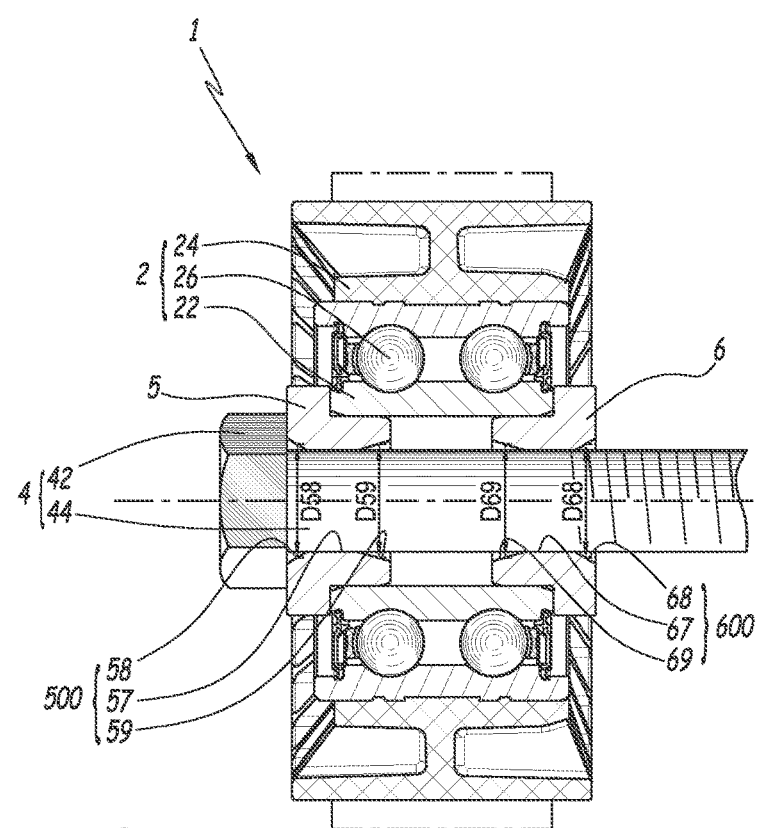
FIG. 10 is a view similar to FIG. 2 of a pulley device according to a third embodiment of the invention.

According to the third embodiment, shown in FIG. 10, the sleeves 5 and 6 have an identical construction and have inner radial surfaces 500 and 600 made up of three portions. In particular, the surface 500 of the sleeve 5 has a cylindrical portion 57 axially surrounded by two frustoconical portions 58 and 59, while the surface 600 of the sleeve 6 has a cylindrical portion 67 axially surrounded by two frustoconical portions 68 and 69. Among these frustoconical portions, the first portions 58 and 68 have a diameter D58 and D68, respectively, increasing and emerging toward the other sleeve 5 or 6. On the contrary, the second frustoconical portions 59 and 69 have a diameter D59 and D69, respectively, increasing and emerging opposite the other sleeve 5 or 6.

According to one embodiment not shown in the figures, the sleeve 6 is as described above, while the sleeve 5 does not include a frustoconical portion and its surface 500 is cylindrical over its entire length L5.

According to another alternative not shown in the figures, the frustoconical portions 58 and 68 extend over the entire inner surfaces 500 and 600 of the sleeves 5 and 6.

Furthermore, the pulley device 1 can be configured differently from FIGS. 2 to 10 without going beyond the scope of the invention. Furthermore, the technical features of the different embodiments and alternatives mentioned above can be combined with one another in whole or in part. Thus, the device 1 can be adapted in terms of cost, functionalities and performance.

What is claimed is:
1. A pulley device, comprising:
a rolling bearing including:
an inner ring defining a central bore,
an outer ring, and
rolling elements mounted between the inner ring and the outer ring;
a pulley secured in rotation with the outer ring and provided with an element for engaging with a transmission member;
a screw comprising a head and a shank housed in the central bore of the inner ring, the screw being configured to fix the pulley device to a motor support;

a first sleeve arranged between the inner ring and the screw, on the side of the motor support;

the first sleeve including an inner surface that has a frustoconical portion having an increasing diameter toward the head of the screw; and a second sleeve arranged radially between the inner ring and the screw, on the side of the head of the screw, the first sleeve and the second sleeve being configured to prevent contact between the screw and the inner ring.

2. The device according to claim 1, further comprising an axial gap defined between the first sleeve and the second sleeve arranged in the bore of the inner ring, the axial gap having a length one of greater than or equal to half of the length of the bore.

3. A pulley device, comprising:

a rolling bearing including:

an inner ring defining a central bore, an outer ring, and rolling elements mounted between the inner ring and the outer ring;

a pulley secured in rotation with the outer ring and provided with an element for engaging with a transmission member;

a screw comprising a head and a shank housed in the central bore of the inner ring, the screw being configured to fix the pulley device to a motor support;

a first sleeve arranged between the inner ring and the screw, on the side of the motor support;

the first sleeve including an inner surface that has a frustoconical portion having an increasing diameter toward the head of the screw;

a second sleeve arranged radially between the inner ring and the screw, on the side of the head of the screw, the second sleeve further comprising an inner surface that has a frustoconical portion having a diameter increasing toward the first sleeve.

4. The device according to claim 1, wherein the first sleeve and the second sleeve have an identical construction.

5. The device according to claim 1, wherein the inner surface of at least one of the first sleeve and the second sleeve has a frustoconical portion having an increasing diameter and emerging opposite the other sleeve.

6. The device according to claim 1, wherein at least one of the first sleeve and the second sleeve has a cylindrical outer surface provided with at least one rib positioned bearing against the inner ring of the rolling bearing.

7. The device according to claim 1, wherein the inner surface of the first sleeve is frustoconical over more than 80% of its axial length.

8. The device according to claim 1, wherein the frustoconical portion of the first sleeve extends over the entire respective inner surface.

9. The device according to claim 1, wherein a minimum diameter of the inner surface of the first sleeve is smaller than a diameter of the shank of the screw.

10. The device according to claim 1, wherein one of the first sleeve and the second sleeve is provided with an outer bevel and an end oriented toward another of the first and the second sleeve.

11. The device according to claim 1, wherein the first sleeve is mounted on the inner ring by one of overmolding, gluing, or pressing.

12. The device according to claim 1, wherein the first sleeve is made from a synthetic material.

13. The device according to claim 1, wherein the first sleeve is made from a polyamide reinforced with glass fibers.

14. The device of claim 3, further comprising:

an axial gap defined between the first sleeve and the second sleeve arranged in the bore of the inner ring, and the axial gap having a length one of greater than or equal to half of the length of the bore.

15. The device according to claim 3, wherein at least one of the first sleeve and the second sleeve has a cylindrical outer surface provided with at least one rib positioned bearing against the inner ring of the rolling bearing.

16. The device according to claim 3, wherein a minimum diameter of the inner surface of the first sleeve is smaller than a diameter of the shank of the screw.

17. The device according to claim 3, wherein one of the first sleeve and the second sleeve is provided with an outer bevel and an end oriented toward another of the first sleeve and the second sleeve.

18. The device according to claim 3, wherein the first sleeve is mounted on the inner ring by one of overmolding, gluing, or pressing.

19. The device according to claim 1, wherein the first sleeve is made from a synthetic material.

* * * * *